H. W. PLEISTER.
BOLT ANCHOR.
APPLICATION FILED SEPT. 20, 1916.
1,265,246.
Patented May 7, 1918.
2 SHEETS—SHEET 2.
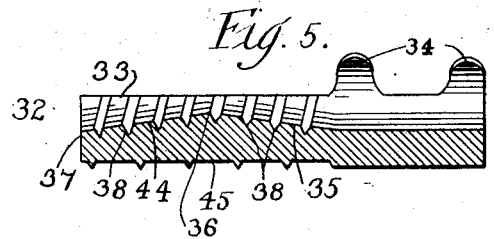
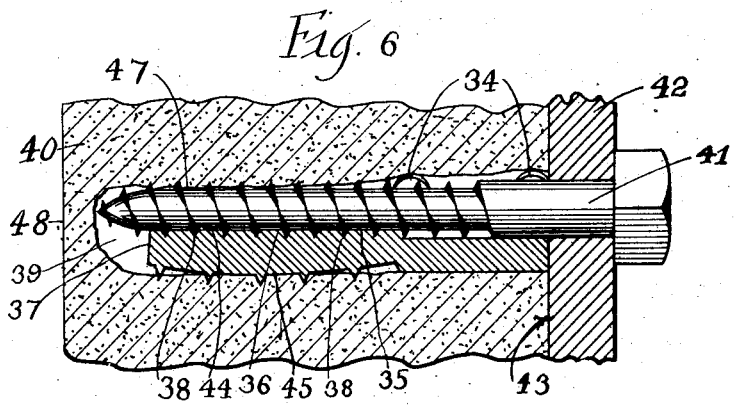
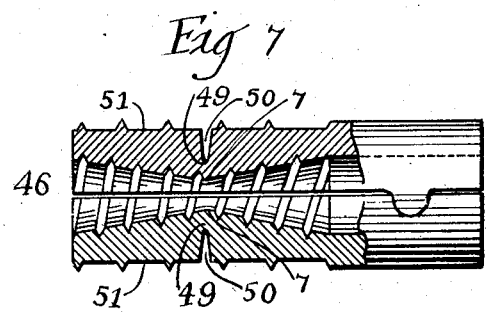
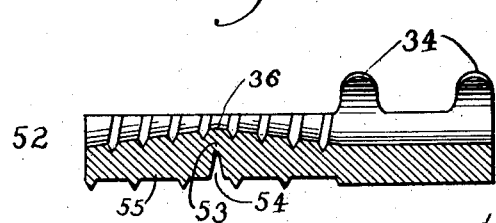
INVENTOR
Henry W. Pleister
BY
Alan M. Johnson
ATTORNEY

UNITED STATES PATENT OFFICE.

HENRY W. PLEISTER, OF WESTFIELD, NEW JERSEY, ASSIGNOR TO HENRY B. NEWHALL.

BOLT-ANCHOR.

1,265,246.

Specification of Letters Patent.

Patented May 7, 1918.

Application filed September 20, 1916. Serial No. 121,105.

*To all whom it may concern:*

Be it known that I, HENRY W. PLEISTER, a citizen of the United States, residing at Westfield, in the county of Union and State of New Jersey, have invented certain new and useful Improvements in Bolt-Anchors, of which the following is a specification, taken in connection with the accompanying drawings.

My invention relates to bolt anchors and more particularly to a bolt anchor which has a great holding capacity and yet one which will not crack a wall, a partition, a block of marble, stone or any other material in which it may be desired to use my bolt anchor.

The common forms of bolt anchors are expanded by having the expanding member, the screw or bolt, moved down an inclined surface which extends approximately from one end to the other, reaching its nearest approach to the axle at the end of the bolt anchor which is farthest embedded in the wall, block or other material. This causes the maximum expansion to be at the very end of the bolt anchor. This makes it impossible to use the ordinary common form of expansion bolt in many locations.

My expansion bolt removes the point of maximum expansion from the end of the bolt and insures a gradually lessening grip and wedging action from that point to the end of the bolt.

My invention further relates to certain details of construction which will be described in the specification and pointed out in the claims.

I have shown in the accompanying drawings several illustrative embodiments of my invention but of course it is to be understood that my invention is not to be confined simply to the forms illustrated except as required by the scope of the appended claims. In these drawings the same reference numerals refer to similar parts.

Fig. 5 is a longitudinal vertical section of my invention shown as a one-part lag shield having an open side permitting the lag screw to engage directly both with the lag shield and the support;

Fig. 6 is a longitudinal vertical section of the lag shield shown in Fig. 5 mounted in a support, and holding the work which is also shown in section;

Figure 1:
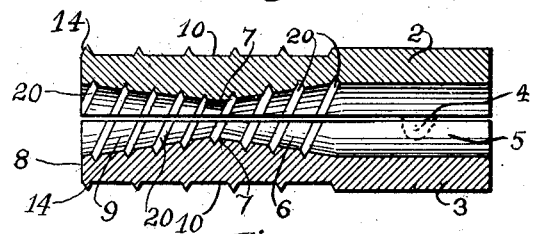
Figure 1 is a longitudinal vertical section of my improved bolt anchor shown embodied as a lag shield.

Fig. 7 is a modification of my invention shown as a two-part lag shield having a weakening portion to further insure that all excessive strains be removed from the end of the bolt anchor; and Fig. 8 is a vertical section of a one part lag shield, such as is shown in Fig. 5, with the addition of the weakening portion to insure that excessive strains and stresses be removed from the end of the bolt anchor.

In the illustrative embodiments of my invention 1 is a bolt anchor formed as a two-part lag shield having complementary portions 2 and 3, and lugs 4. The axial bore 5 is provided with an inclined portion 6 which reaches its nearest approach to the axis adjacent to points 7, 7 which are removed from the end 8 of the shield. From the points 7, 7, to the end 8, the axial bore has a flaring portion 9 or one which recedes from the points 7, 7. In this form the point of greatest expansion will be approximately at the points 10, 10 and from those points to the end 8 of the shield the expanding strains will recede or lessen.

It is well known that in thin masonry walls or thin partitions 11, which have the strength to support the work 12 of a given weight, that it is impossible to use bolt anchors satisfactorily because the wall or partition 11 is relatively so thin that their use will crack or destroy the surface 13 of the wall or partition thereby giving an unsightly appearance to that wall if not actually requiring the services of a mason or plasterer to touch it up or repair it.

By my invention I avoid the cracking or marring or breaking of the wall or support 11 by removing the maximum strain and wedging stresses from the points 14, 14, to a point removed from the end 8 of the bolt anchor and far enough away from the surface 13 so as to bring the point of maximum expansion well within the body of the wall or partition 11.

Figure 2:
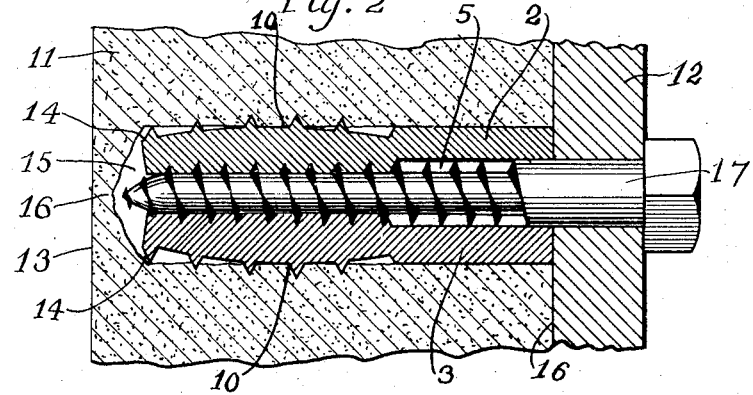
Fig. 2 is a longitudinal vertical section of the lag shield shown in Fig. 1, expanded and mounted in a comparatively thin wall or partition.

In the operation of my invention, Fig. 2, the hole 15 is formed in the wall or partition 11, leaving a comparatively thin portion 16. The bolt anchor is then inserted, and the work 12, whatever its weight may be, will be snugly held to the face 116 of the wall or partition 11 by means of the lag screw 17 which will exert the maximum pressure at substantially the points 10, 10 well within the wall or partition and removed from the thin portion 16. From the points 10, 10 to the end 8 the gripping action will gradually lessen so that at the very end 8 of the bolt anchor no strains will be exerted which would cause the fracture, crumbling or marring of the face 13 of the wall or support 11.

Figure 3:
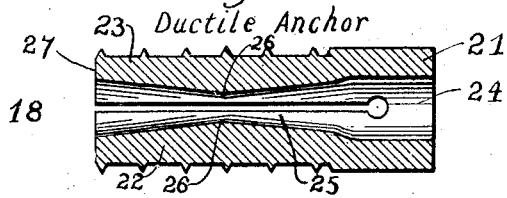
Fig. 3 is a longitudinal vertical section of my bolt anchor shown as a ductile anchor, anchor, or screw anchor.
Figure 4:
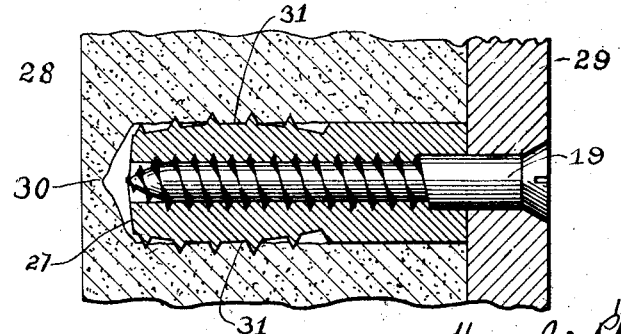
Fig. 4 is a vertical section of my anchor shown in Fig. 3 mounted in a comparatively shallow block of marble, stone or similar material. The work supported is shown in section and the wood screw in side elevation.

My invention is equally applicable to the form of bolt anchors known as ductile anchor, anchor, or screw anchor in which the anchor 18, Fig. 3, is formed of sufficiently ductile material, usually an alloy of lead, in which the wood screw 19 will cut its own coöperating female screwthreads. In the lag screw shield shown in Figs. 1 and 2, the screwthreads 20 are cast in sand molds at the same time that the portions 2 and 3 of the shield are cast.

The anchor shown in Fig. 3 has a collar 21 and two tines 22, 23 and an axial bore 24 which has the tapered portion 25 reaching its nearest approach to the axis at 26, and then receding or flaring from that point to the end 27 of the lead anchor. It is to be understood that ordinarily these ductile anchors, anchors, or screw anchors or lead anchors as they are called in the trade, are used for lighter work than are the lag shields shown in Figs. 1 and 2.

Often in a marble block or other slab 28, or similar material to which it is desirable to support work 29, great danger is run of breaking the comparatively thin portion 30 of the block, when an anchor of the ordinary form is used having its maximum expansion at practically the very end of the anchor.

By my invention I permit the work 29 to be supported on such a block, or similar material, leaving the very thin portion 30 which however is not cracked, crumbled or marred in any manner for the reason that the maximum expansion occurs well within the block at the points 31, 31 and removed from the end 27 of the shield and the thin portion 30 of the block. This maximum expansion then tapers or gradually becomes less at the point 31 to the end 27 as the wood screw 19 cuts its own female thread along the inclined bore 25 past the points 26 to the end 27 of the lead anchor.

I may also apply my invention to a one part lag shield 32, Fig. 5, having an open side 33, lugs 34, 34 and an inclined surface 35 which reaches its nearest approach to the axis at the point 36 and then recedes to the point 37, the screw threads 38 being preferably cast in the lag shield 32, though of course it is to be understood that if desired the shield 32 may be formed of some ductile material in which the screw cuts its own coöperating thread.

In use this one-part lag shield 32 is put into a hole 39 formed in a thin wall or partition 40, Fig. 6, and the lag screw 41 holds the work 42 to the face 43 of the wall or partition 40 by engaging with the inclined surface 35 and the flaring surface 44, the maximum expansion being substantially at the point 45 and then decreasing from that point to the end 37 of the shield. In this form the lag screw 41 also coöperates directly with the surface 47 of the hole 39 as well as with the one part lag shield 32. It will be clear that the surface 48 of the partition or wall 40 will not be marred because the maximum expansion is removed well within the wall and away from said surface.

To make the action more delicate and to insure that no possible excessive strain shall be caused to be exerted near the end of the bolt anchor I may provide my bolt anchor 46 with weakening portions 49, 49, Fig. 7. This form is the same as the form shown in Fig. 2, except that the weakening portions are provided in any suitable manner such as by forming deep valleys 50. When the lag screw 17 passes the point 7 the weakening portions 49, 49 will permit the ends 51, 51 to move slightly with relation to the other portion of the lag shield and tend to cause the two sides of the valleys 50, 50 to move apart or open, should by any circumstances any considerable strain be exerted upon the portions 51, 51 which might have a tendency to crack or injure the surface 48 of the wall or partition, block or any other support.

In Fig. 8 I have shown the same idea as in Fig. 7 applied to a one-part lag shield 52. This one part lag shield is the same as that shown in Fig. 5, except that adjacent to the point 36 I provide a weakening portion 53 by forming a deep valley 54 in the lag shield. The action of this lag shield is the same as that shown in Fig. 6, except that it is more delicate for the inner portion 55 will yield if any excessive pressure is applied and will tend to open up the valleys 54, 54.

In all figures of the drawings the inclined and flaring surfaces are somewhat exaggerated for purposes of illustration.

It is also apparent that different thicknesses of work can be held by the same bolt anchor without the screw or bolt binding before it has snugly secured the work to the face of the wall, partition, block or other support.

Having thus described this invention in connection with several illustrative embodiments thereof, to the details of which I do not desire to be limited except as required by the scope of the appended claims, what is claimed as new and what is desired to secure by Letters Patent is set forth in the appended claims:

1. In a bolt anchor, the combination of an expanding member, and an expansible member provided with means to insure the maximum expansion of the expansible member at a point between its ends.

2. In a bolt anchor, the combination of an expanding member, and an expansible member provided with integral means to insure the maximum expansion of the expansible member at a point between its ends.

3. In a bolt anchor the combination of an expansible member having an inclined expanding surface reaching its nearest approach to the axis between the ends of the expansible member and from that point having a flaring surface, and a screw to coöperate with both of said inclined and flaring surfaces to insure that the maximum expansion of the expansible member will be at a point between its ends.

4. In a bolt anchor the combination of a two part expansible member having an inclined expanding surface reaching its nearest approach to the axis between the ends of the expansible member and from that point having a flaring surface, and a screw to coöperate with both of said inclined and flaring surfaces to insure that the maximum expansion of the expansible member will be at a point between its ends.

5. The combination of a two part lag shield having an inclined expanding surface reaching its nearest approach to the axis between the ends of the lag shield and from that point having a flaring surface, and a screw to coöperate with both of said inclined and flaring surfaces to insure that the maximum expansion of the lag shield will be at a point between its ends.

HENRY W. PLEISTER.

Witnesses:
   A. M. WILLIAMS,
   M. R. RYAN.

Copies of this patent may be obtained for five cents each, by addressing the "Commissioner of Patents, Washington, D. C."